(12) United States Patent
Zhang et al.

(10) Patent No.: US 12,202,744 B2
(45) Date of Patent: Jan. 21, 2025

(54) FLUORIDE REMOVAL PROCESS

(71) Applicant: ETH Zurich, Zürich (CH)

(72) Inventors: Qingrui Zhang, Zürich (CH); Raffaele Mezzenga, Volketswil (CH); Sreenath Bolisetty, Zürich (CH)

(73) Assignee: ETH Zurich, Züric (CH)

( * ) Notice: Subject to any disclaimer, the term of this patent is extended or adjusted under 35 U.S.C. 154(b) by 665 days.

(21) Appl. No.: 17/296,189

(22) PCT Filed: Oct. 21, 2019

(86) PCT No.: PCT/EP2019/078541
§ 371 (c)(1),
(2) Date: May 21, 2021

(87) PCT Pub. No.: WO2020/104125
PCT Pub. Date: May 28, 2020

(65) Prior Publication Data
US 2022/0009798 A1    Jan. 13, 2022

(30) Foreign Application Priority Data
Nov. 23, 2018  (EP) ................................ 18208060

(51) Int. Cl.
*C02F 1/28* (2023.01)
*B01D 39/16* (2006.01)
(Continued)

(52) U.S. Cl.
CPC ......... *C02F 1/288* (2013.01); *B01D 39/1615* (2013.01); *B01D 39/2027* (2013.01); *B01D 67/00042* (2022.08); *B01D 67/00043* (2022.08); *B01D 67/00793* (2022.08); *B01D 69/12* (2013.01); *B01D 71/021* (2013.01);
(Continued)

(58) Field of Classification Search
None
See application file for complete search history.

(56) References Cited

U.S. PATENT DOCUMENTS

| | | | |
|---|---|---|---|
| 2012/0041246 A1* | 2/2012 | Scher | C01G 31/02 502/305 |
| 2017/0096349 A1* | 4/2017 | Bolisetty | B01D 39/14 |

FOREIGN PATENT DOCUMENTS

| | | |
|---|---|---|
| CN | 101555078 A | 10/2009 |
| CN | 102942239 A | 2/2013 |

(Continued)

OTHER PUBLICATIONS

International Searching Authority, "International Search Report & Written Opinion", issued in connection with International Patent Application No. PCT/EP2019/078541, mailed on Jan. 23, 2020, 10 pages.

(Continued)

*Primary Examiner* — Peter Keyworth
(74) *Attorney, Agent, or Firm* — Nyemaster Goode P.C.

(57) ABSTRACT

The present invention relates to the field of water treatment/fluoride removal and to materials/devices useful in such processes. Specifically, the invention provides for hybrid materials comprising amyloid fibrils and $ZrO_2$; and to composite materials further comprising a support material. The invention further provides for the treatment of water using such hybrid or composite materials.

20 Claims, 3 Drawing Sheets

Figure 1:
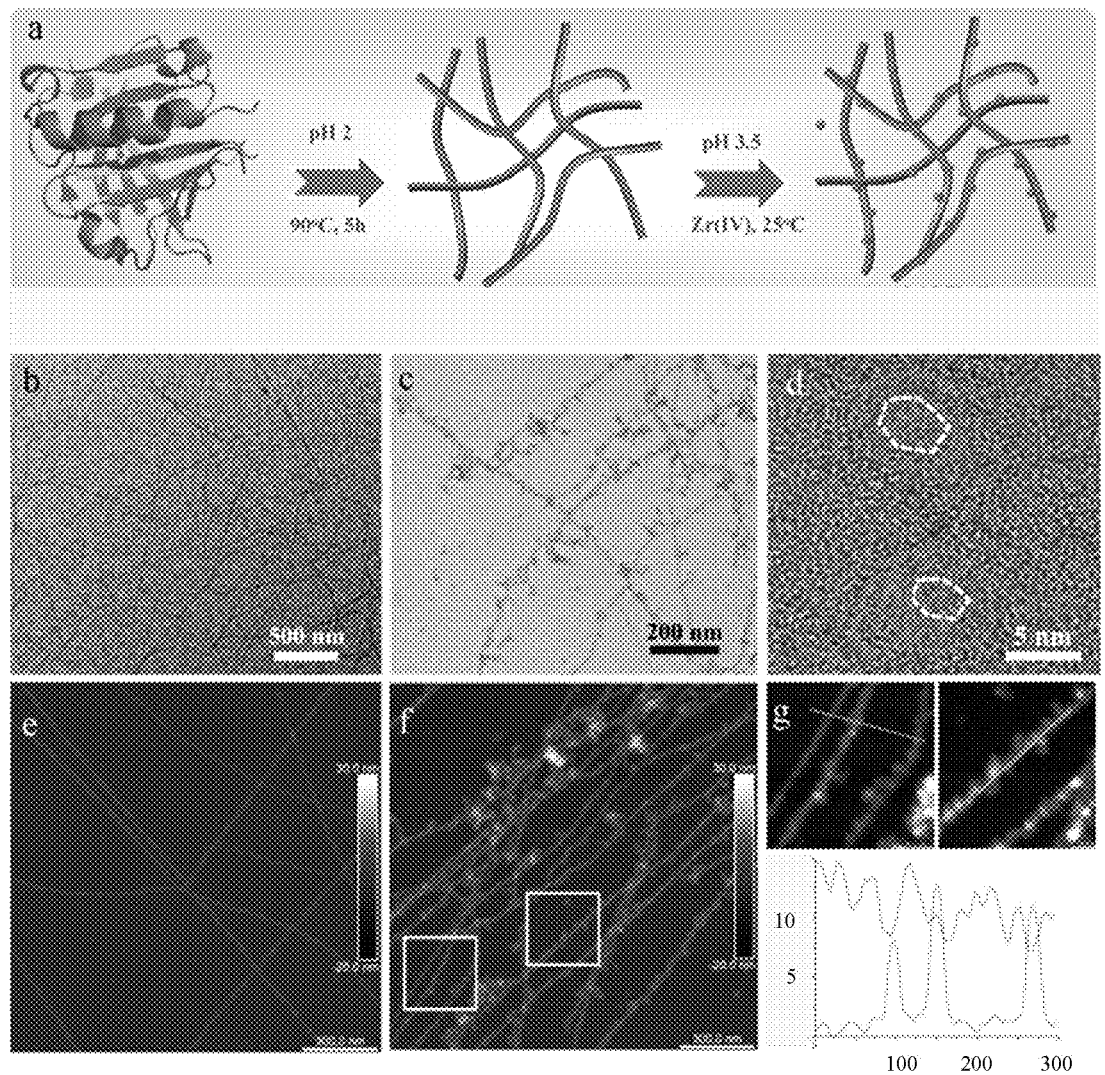

(51) Int. Cl.
- *B01D 39/20* (2006.01)
- *B01D 67/00* (2006.01)
- *B01D 69/12* (2006.01)
- *B01D 71/02* (2006.01)
- *B01J 20/02* (2006.01)
- *B01J 20/20* (2006.01)
- *B01J 20/24* (2006.01)
- *B01J 20/28* (2006.01)
- *B01J 20/30* (2006.01)
- *B01J 20/32* (2006.01)
- *C02F 1/44* (2023.01)
- *C02F 101/14* (2006.01)

(52) U.S. Cl.
CPC ........... *B01J 20/0211* (2013.01); *B01J 20/20* (2013.01); *B01J 20/24* (2013.01); *B01J 20/28007* (2013.01); *B01J 20/28028* (2013.01); *B01J 20/28038* (2013.01); *B01J 20/28085* (2013.01); *B01J 20/3042* (2013.01); *B01J 20/3204* (2013.01); *B01J 20/3274* (2013.01); *C02F 1/44* (2013.01); *B01D 2239/0258* (2013.01); *B01D 2239/0407* (2013.01); *B01D 2239/1225* (2013.01); *B01D 2239/1233* (2013.01); *B01D 2239/1241* (2013.01); *B01J 2220/46* (2013.01); *B01J 2220/4856* (2013.01); *C02F 1/281* (2013.01); *C02F 1/286* (2013.01); *C02F 2101/14* (2013.01); *C02F 2305/08* (2013.01)

(56) References Cited

FOREIGN PATENT DOCUMENTS

| CN | 105107388 A | 12/2015 |
| CN | 106457100 A | 2/2017 |
| EP | 1381440 B1 | 1/2004 |
| WO | 2015140074 A1 | 9/2015 |
| WO | 2017201061 A1 | 11/2017 |

OTHER PUBLICATIONS

Sreenath Bolisetty et al, "Amyloid-carbon hybrid membranes for universal water purification", Nature Nanotechnology, vol. 11, No. 4, Jan. 25, 2016 (Jan. 25, 2016), p. 365-371.

Qingrui Zhang et al, "Selective and Efficient Removal of Fluoride from Water: In Situ Engineered Amyloid Fibril/$ZrO_2$ Hybrid Membranes", Angewandte Chemie, vol. 131, No. 18, Apr. 23, 2019 (Apr. 23, 2019), p. 6073-6077.

National Intellectual Property Administration of the PRC, "First Office Action," issued in connection with related application No. CN 201980089658.5 with English translation, Feb. 11, 2023, 13 pages.

National Intellectual Property Administration, PRC, "Search Report," issued in connection with related application No. CN 201980089658.5 with English translation, Feb. 9, 2023, 5 pages.

Zhang et al., "Selective and Effcient Removal of Fluoride from Water: In Situ Engineered Amyloid Fibril/$ZrO2$ Hybrid Membranes", Angew. Chem. Int. Ed., Feb. 21, 2019, 58, 6012-6016.

\* cited by examiner

FLUORIDE REMOVAL PROCESS

CROSS-REFERENCE TO RELATED APPLICATIONS

This application is a Section 371 United States National Phase Entry Application of International Patent Application No. PCT/EP2019/078541, filed Oct. 21, 2019, entitled FLUORIDE REMOVAL PROCESS, which claims priority to European Patent Application No. 18208060.6, filed Nov. 23, 2018, all of which are incorporated herein by reference in their entirety.

The present invention relates to the field of water treatment/fluoride removal and to materials/devices useful in such processes.

Fluoride pollution in waters is a world-wide environmental issue, which mainly originated from the geochemical processes and industrial production. WHO authorized a strict control of 1.5 mg/L for drinking water. Effective and selective removal of fluorine from aqueous is highly desirable for both drinking water and wastewater contamination remediation purposes; however, most of present adsorbents exhibit inferior removal capability and low activity. Developing new functional materials with strong capability, especially for both high (>50 mg/l) and low (<10 mg/L) concentration of fluoride purification still remains a great challenge.

CN101555078 describes a method for removing fluorine by using nano-activity zirconium dioxide. The method comprises three parts of pre-treatment of fluorine-containing water, nano-adsorption and regeneration treatment. The fluorine-containing water is sent to a filter device through a pipeline; the filter device is connected with a water inlet of a fluorine removal tower containing nano-filter materials; a water outlet of the fluorine removal tower meets the emission standards; the fluorine removal tower is respectively connected with an alkaline tank and a regeneration tank; and desorption liquid flows into a sediment tank after the treatment.

EP1381440 discloses nanostructures comprising gold nanoparticles and amyloid fibrils suitable in detecting analytes.

Thus, it is an object of the present invention to mitigate at least some of these drawbacks of the state of the art. In particular, it is an aim of the present invention to provide processes for treatment of water and for removal of fluoride form aqueous compositions, as well as materials and devices useful in such processes.

These objectives are achieved by the material as defined in claim 1 and a method as defined in claim 10. Further aspects of the invention are disclosed in the specification and independent claims, preferred embodiments are disclosed in the specification and the dependent claims.

The present invention will be described in more detail below, referring to the first and second aspect of the invention. The first aspect is directed to new materials, devices, their manufacturing and their uses. The second aspect is directed to methods for the treatment of water using such materials and devices. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a," "an," "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense. The term "containing" shall include "comprising", "essentially consisting of" and "consisting of".

The present invention will be better understood by reference to the figures.

FIG. 1: Structural characterization of the inventive composite material:
  a) Shows a schematic representation of manufacturing the inventive amyloid fibrils confined nano-ZrO2 (left: beta-lactoglobulin; center: amyloid fibrils, right: inventive composite) as further described in ex. 1;
  b) TEM image of amyloid fibrils, scale bar 500 nm;
  c) TEM image of amyloid fibrils confined nano-ZrO2, scale bar 200 nm;
  d) High-resolution TEM image of amyloid fibrils confined nano-ZrO2, scale bar 5 nm;
  e) AFM image of amyloid fibrils, scale bar 300 nm;
  f) AFM image of amyloid fibrils confined nano-ZrO2, scale bar 300 nm;
  g) height comparison before and after nano-ZrO2 coating; y-axis: height [nm]; x-axis length [nm]

Figure 2:
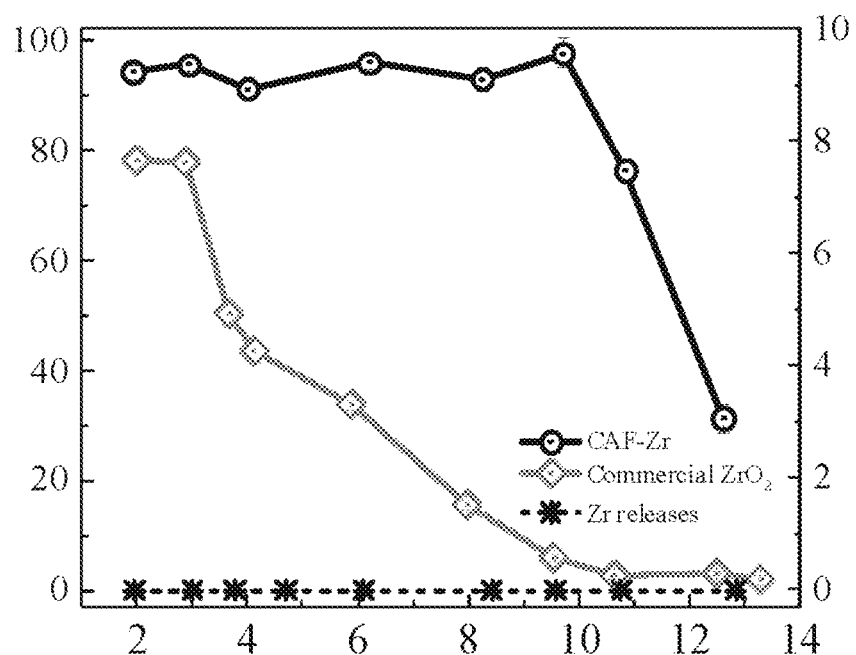

FIG. 2: Solution pH influence on fluoride purification onto CAF-Zr and Zr ion releases with commercial ZrO2 for a reference (initial F=10.2 mg/L, the filtration was conducted at room temperature)
x-axis solution pH in feeding;
y-axis (left): fluoride removal, [%] y-axis (right Zr release [mg/l]

Figure 3:
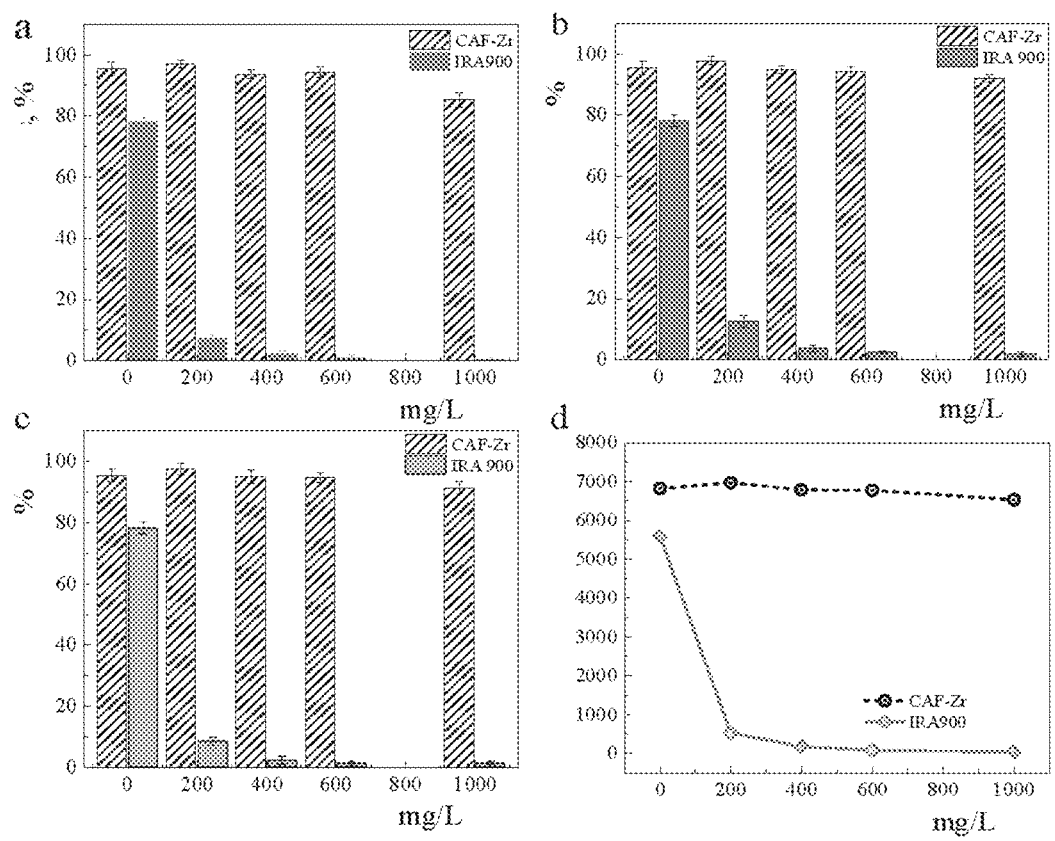

FIG. 3: Selectivity Evaluation (a-c) Effect of competitive ions on fluoride removal onto CAF-Zr membrane (inventive, dashed bars) and IRA-900 (comparative, solid bar);
  (a) x-axis: sulfate ions, y-axis: fluoride uptake [%]
  (b) x-axis: chloride ions, y-axis: fluoride uptake [%]
  (c) x-axis: nitrate ions; y-axis: fluoride uptake [%]
  (d) ion distribution coefficient Kd comparison of CAF-Zr membrane (inventive, dashed) and IRA-900 (for comparison, solid); y-axis: Kd [mL/g]; x-axis: sulfate ion addition [mg/L].

Figure 4:
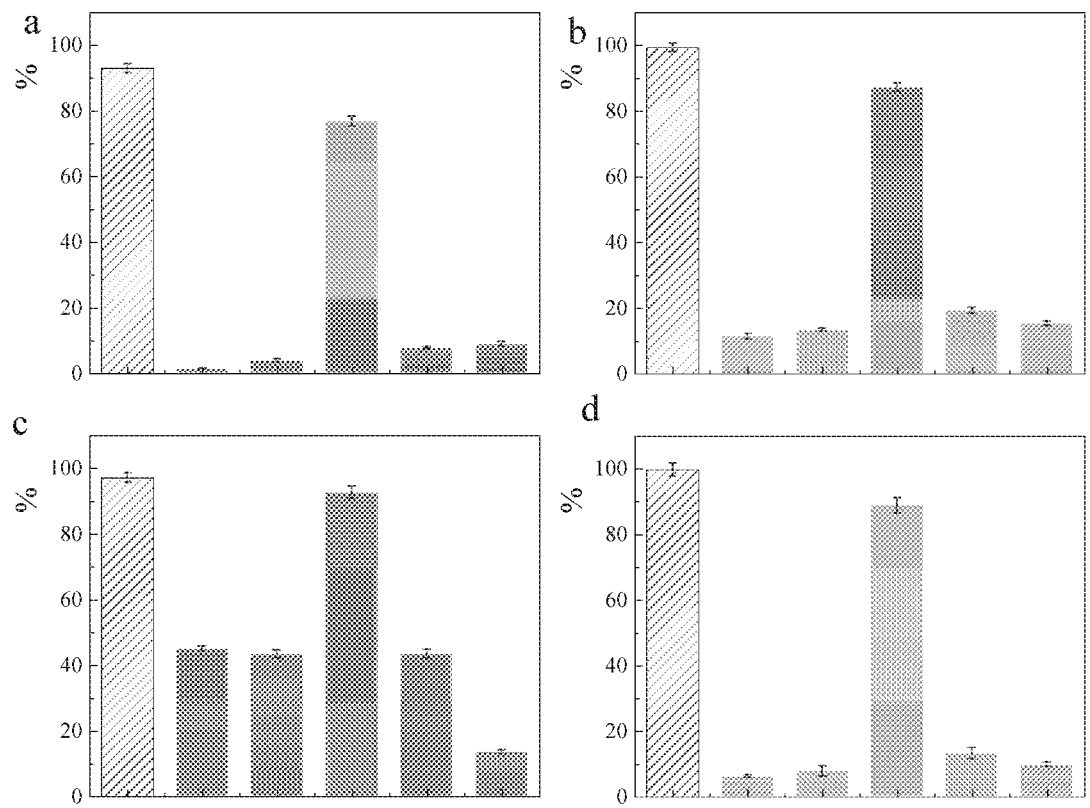

FIG. 4: Fast Filtration Comparisons (a-d) fluoride removal comparison by filtration onto series commercial sorbents at different concentration and solution surroundings (CAF-Zr membrane according to this invention, surface areas, 0.0002 m2, diameter, 1.6 cm with thickness: 2 mm; the tap-water is taken from Switzerland with solution pH=7.2-7.6 and acidic wastewater component: HCO3-=50 mg/L, Cl-=250 mg/L, SO42-=150 mg/L, NO3-=120 mg/L, Ca2+=55 mg/L, Na+=280 mg/L, pH=2.5-2.8) y-axis: Fluoride uptake [%];
  x-axis from left to right: CAF-Zr (inventive material, dashed)-Carbon-CAF-Nano-ZrO2-IRA-900-Al2O3 (each for comparison, solid).

Figure 5:
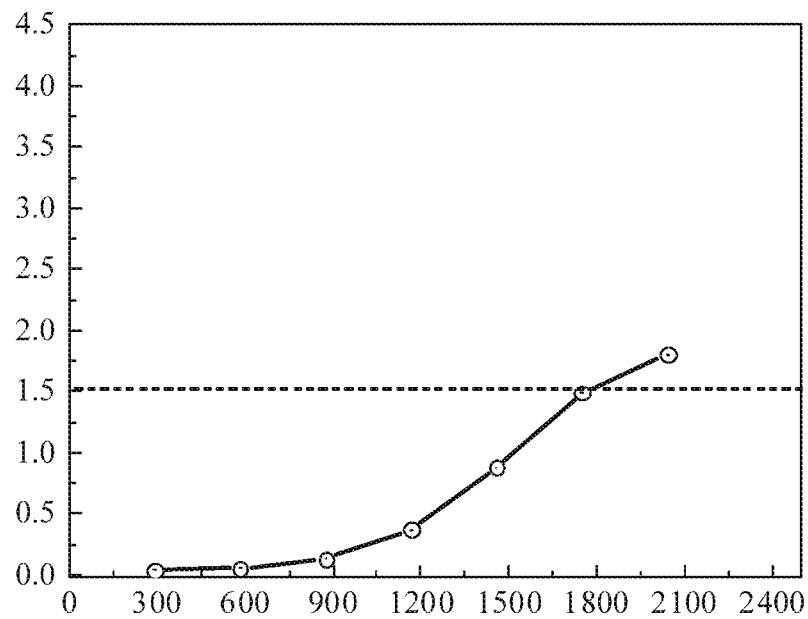

FIG. 5: Real Application Evaluation (a) Treatment capacity of hybrid membrane CAF-Zr for fluoride removal x-axis: treated capacity [litres water/m2 membrane]; y-axis: fluoride contents after filtration [mg/L] (The feeding is from real natural water contaminated with fluoride, F=2.8 mg/L, pH=7.5-7.8) (b) the sorption-regeneration performance (regeneration: 1% NaOH+5% NaCl for 10 mL).

In more general terms, in a first aspect, the invention provides for novel materials comprising (a) amyloid fibrils; (b) nanoparticulate ZrO2; and (c) optionally a support material. In case component (c) is absent, these materials are termed hybrid materials. In case component (c) is present, these materials are termed composite materials. This aspect of the invention shall be explained in further detail below:

It was surprisingly found that constituents (a) and (b) synergistically interact when treating fluoride containing water. This synergistic effect is particularly pronounced, and therefore advantageous, in case said amyloid fibrils and said nanoparticulate ZrO2 are in intimate contact. The ratio of both constituents may vary over a broad range, depending on the specific material, the intended use and the device containing the composite material. Particularly good results are obtained, in case the ratio (a)/(b) is in the range of 1/0.1 to 1/300 (w/w) particularly preferably 1/1 to 1/100 (w/w).

Such composite material exhibits superior removal performances, the removal efficiency can reach above 99.2%, which is also suitable for both low (below 10 ppm) and high (above 50 ppm) concentrations F contaminated waters, the effluent can be reduced to approximately 0.1 ppm. Further, the composite materials may be used for treatment of both low and high concentration F contaminated water, it also suitable for both neutral natural water and acidic wastewaters. The hybrid material is eco-friendly, which is very important for drinking water purification.

Hybrid Material:

According to the invention constituents (a) and (b) are in intimate contact. The individual constituents remain separate and distinct within the finished structure but are thoroughly and randomly mixed. This is ensured by the manufacturing process. The material exhibits properties of both, amyloid fibrils and ZrO2, and is therefore termed hybrid material.

The inventive hybrid material may be described as amyloid fibrils confined nano-ZrO2. As shown in FIG. 1, the amyloid fibrils are a carrier and nano-ZrO2 particles bind to the amyloid fibrils. Typically, the size of hybrid material is in the range of 1 micrometre to 5 millimetres, while the ZrO2, typically is in the range of 10 nm or less.

Composite Material:

The above hybrid material may be combined with a support material to thereby obtain a composite material. The support material (c) may be a separate layer (e.g. in case of a filter membrane) thereby forming a composite material with layered structure. Alternatively, the support material (c) may be combined with the hybrid material to form a complex composite material in particulate appearance (e.g. in the case of an adsorbent material). Typically, the particle size of such material is in the range of 1 micrometre to 5 millimetres. Such materials may be used in depth filters and/or as adsorbent medium. Accordingly, the invention also provides for a filter device, comprising such composite material, typically depth filters or adsorbent columns.

Amyloid Fibrils:

The term "amyloid fibrils" is generally known in the field and particularly describes fibrils made by proteins or peptides prevalently found in beta-sheet secondary structure. Accordingly, the term amyloid fibrils excludes native proteins.

Advantageously, the amyloid fibrils have high aspect ratio, preferably with ≤10 nm in radius and ≥0.5 μm in length, particularly preferably ≤5 nm in radius and ≥1 μm in length.

Advantageously, the amyloid fibrils have a highly charged surface. The term highly charged surfaces is generally known in the field and particularly describes surfaces showing electrophoretic mobilities of the order 2 μm·cm/V·s at pH 4. Electrophoretic mobilities may be determined according to zeta-potential measurement; i.e. colloidal drift mobility under an electronic field.

Nanoparticulare ZrO2:

ZrO2 is a material known per se. In the context of this invention, ZrO2 of nanoparticulate size is preferred, such as ZrO2 below 50 nm ("sub-50 nm ZrO2"), preferably below 10 nm ("sub-10 nm ZrO2"). Sub-10 nm ZrO2 was found to be particularly useful as it possess ultrahigh activity and ability for fluoride removal, it is also convenient to deposit onto activated carbon for membrane preparation. In addition, different from the complicated preparation for nanoparticles, the simple self-assemble feature as described below also endows the large-scale production promising for industrial purposes.

Advantageously, ZrO2 is conveniently obtained and deposited in situ as described herein. It is thus preferred not to use commercial nanoparticulate ZrO2. Rather, the present amyloid fibrils comprise complex ZrO2 particles of ultrafine size (e.g. sub-10 nm). Without being bound to theory, it is believed that this is a very important feature to allow deposition and formation of highly active nano-ZrO2. It is further believed that the self-assemble feature is also related to the amyloid fibrils confined nano-ZrO2. The composite material may thus be described as amyloid fibrils comprising confined nano-ZrO2.

Support Material:

As discussed above, hybrid materials are free of a support material, while composite materials comprise such support. For many applications, composite materials, such as the above discussed composite materials comprising either a layered structure or a complex structure, are preferred. Support materials may be selected from a broad range of known materials. The choice of support material depends on its intended use. Suitable are, for example porous support materials, including zeolites, activated alumina, activated carbon and the like. A preferred support material is activated carbon.

Activated Carbon:

The term is known in the field and includes all commercial grades thereof. Suitable activated carbon may be produced from produced from carbonaceous source materials such as renewable sources (including nutshells, coconut husk, peat, wood, coir) but also conventional sources (including lignite, coal, and petroleum pitch). Suitable activated carbon may be produced by chemical activation or physical activation. Physical activation includes activation by gas or steam.

Devices:

The hybrid materials and the composite materials find commercial application in a large variety of devices, including filter devices and adsorbent devices.

In one advantageous embodiment, the invention relates to a composite material as described herein in the form of a filter device, said filter device comprising constituents (a), (b) and (c). Accordingly, the invention also provides for a filter device, comprising such composite material. Such filter may be any type of filter known in the field, typically surface filters including pressure- and vacuum-surface filters.

In one embodiment of such filter devices, constituents (a) (b) are (c) are intimately mixed. This composite material is located on top of a filter membrane, such as a cellulose membrane.

in one alternative embodiment of such filter devices, constituents (a) (b) are arranged upstream, while support material (c) is arranged downstream.

In one alternative embodiment of such filter device, all the components, constituents (a), (b) and (c), are combined with a binding material (d), such as cellulose pulp or polymer material, to prepare a filter material/a filter membrane. Such filter material/filter membrane may be comprised in a filter devices or adsorbent device.

Manufacturing:

The inventive composites are simple in manufacturing; large-scale production is promising using starting materials readily available. The composite material is cheap, as all components (a), (b) and (c) are readily available. Component (a) may be obtained from various protein sources including whey protein, which is a by-product from cheese industry. Whey can also be used directly. Component (b) may be obtained in situ; component (c) is a commercial item. This is considered a great advantage, as it allows for single use (ie. without the need for recycling the composite materials or the filters).

The invention thus provides for a method for manufacturing a composite material as described herein, said method comprising the steps of (i) combining a solution comprising Zr(IV) precursor and amyloid fibrils under acidic aqueous conditions; (ii) adjusting pH until precipitation occurs, preferably to pH 3.5-4.0, to thereby obtain a first suspension; (iii) combining the thus obtained first suspension with a dispersion comprising the support material, such as activated carbon, to thereby obtain a second suspension; and (iv) filtering said second suspension to thereby obtain said composite material.

The manufacturing may take place at room temperature, or at slightly elevated temperatures.

Step (i): The synthesis of amyloid fibrils is a known technology. Suitable is in particular protein hydrolysis followed by n-sheets driven fibrillation, as described e.g. in Jung et al. (Biomacromolecules. 2008, 9, 2477-2486). Suitable starting materials are food-grade proteins, which are structural stable, wide accessible and inexpensive. Such starting materials allow preparation of amyloid fibrils, such as β-lactoglobulin. Suitable proteins may be selected from the group consisting of β-lactoglobulin, lysozyme, ovalbumin, and serum albumins. The self-assembly process is facile and controllable. Typical process parameters include incubating protein solution (e.g. 2 wt. % β-lactoglobulin) for a prolonged period of time (e.g. 6 h) under acidic conditions (e.g. pH ~2), low ionic strength (e.g. I≤20 mM), high temperature (e.g. T~90° C.). Suitable Zr(IV) precursors are known and include ZrOCl2, particularly as an aqueous solution. Typically, the amyloid fibrils are prepared first and the Zr(IV) precursor is added in the form of an aqueous solution.

Steps (ii), (iii) and (iv) are entirely conventional.

Use:

As outlined above, the inventive materials (ie. hybrid materials and composite materials) and the inventive devices (e.g. filter devices and adsorbent devices) are useful in the treatment of water and/or the removal of fluoride. The invention thus provides for the use of a materials and devices as described herein, for the treatment of water and/or the removal of fluoride. It will be appreciated by the skilled person, and further outlined below, that the terms "filtering" and "filtration" are used in a broad sense, particularly including removal of dissolved fluoride from water or aqueous compositions.

The term water, as used herein, shall include municipal waste water, industrial waste water, drinking water and natural water.

The term removal of fluoride shall include the removal of fluoride from any source, particularly from any liquid, semi-solid or solid material. Removal efficiencies observed are in the range of more than 95%, such as more than 99%, in particular more than 99.5%.

In a second aspect, the invention relates to a method for the treatment of water, said method comprising the step of contacting said water with the inventive material described herein. Known methods are applicable to the inventive material; thereby avoiding new processes or high investments. It is considered an advantage, that existing methods/processes may be adapted by simply replacing the existing adsorbent/filter materials with the inventive materials described herein. This aspect of the invention shall be explained in further detail below:

In one embodiment, the invention relates to a method for the treatment of water, said method comprising the step of (i) providing a composite material as described herein and fluoride containing water; (ii) contacting said water with said composite material, thereby obtaining purified water and loaded composite material; (iii) separating the purified water from the loaded composite material. Steps (ii) and (iii) are optionally repeated to further reduce fluoride content.

The term "treatment of water" particularly includes reduction of fluoride content. By the inventive process, it is possible to remove more than 95% of fluoride by one single treatment cycle. The method as described herein has an extremely broad application spectrum and includes treatment of all types of water. It is applicable to continuous and discontinuous processes, small scale and large scale facilities, as stand-alone unit or as part of a larger treatment-system. The term "water" is defined above; accordingly, "waste water" refers to water having a high fluoride content while "purified water" refers to water having a reduced fluoride content.

The individual steps noted above are entirely conventional in the field—but not yet applied using the inventive materials as described herein and not yet applied to the water sources as discussed above. Advantageous embodiments of the above steps shall be further elucidated below.

In a preferred embodiment, in step (i) of said method the composite material is provided in the form of a filter device; and steps (ii) and (iii) are performed by filtering said fluoride containing water through said filter.

In a preferred embodiment, in step (i) of said method the composite material is provided in the form of particulate material. In step (ii), said fluoride containing water and said composite material are contacted for a period of 0.1-24 hrs., optionally with stirring. Optionally the temperature is controlled, e.g. at a temperature range from 5-95° C. In step (iii) the obtained materials are separated. Separation may take place by filtering, centrifuging or settling. Steps (ii) and (iii) may be repeated.

In one embodiment, the composite material may be provided in the form of a filter and the waste water may be provided continuously. Step (ii) and (iii) may be performed simultaneously by filtering said waste water through said filter.

The skilled person will appreciate that the method described herein provides significant advantages over the prior art: First, the method is economical, simple, safe robust and fast. Second, a scale-up is simple. Finally, the method may be fine-tuned by using several cycles, by adapting the inventive material used and other parameters.

To further illustrate the invention, the following examples are provided. These examples are provided with no intend to limit the scope of the invention.

1. Preparation of the Hybrid Membrane
Amyloid Fibrils Confined ZrO2 Nanoparticles Amyloid fibrils were prepared according to Sreenath B. and Raffaele M. Nat. Nanotechnol. 2016, 11, 365-371. Briefly, 10 wt % of the β-lactoglobulin (pH=4.6) is completely centrifuged at 15 000 rpm for 15 min to realize the solid-liquid separation. The supernatant solution is adjusted to pH 2 and filtered using a 0.22 μm millipore syringe filter membrane. Afterward, a further purification process is conducted through a dialysis membrane (spectra/por dialysis MWCO: 6-8 kDa) to eliminate existing ion species with finalizing pH 4.5-4.8. After finishing the dialysis, the purified solution was readjusted to pH 2 and freeze-dried; the amyloid fibrils were prepared by heating 2 wt % protein monomers at 90° C. for 5 h.

As for the amyloid fibrils confined nano-ZrO2, firstly, 4 g of $ZrOCl_2*7H_2O$ was dissolved in 20 mL of 2 wt % amyloid fibrils for shaking 3 h. the amino group of fibrils will interact with Zr(IV) ions in solution by strong complexation affinity, afterward, the solution pH was adjusted to pH=3.5-4.0 using 1% NaOH, until white precipitation formation, and the amyloid fibrils confined ZrO2 nanoparticles were obtained. The hybrid absorber membranes were further prepared with the following procedures; 2 ml of a 10 wt % dispersion of activated carbon was mixed with 2 ml of amyloid fibrils confined ZrO2 nanoparticles. Next, 1 ml volume of this mixture was vacuum-filtered using 0.22 μm cellulose filters. The strong adhesiveness of amyloid fibrils endorses the homogeneous assembly of the resulting ZrO2 nanoparticles onto porous carbon for hybrid membrane preparation (surface areas: 0.0002 m2, diameter: 1.6 cm and thickness: 2 mm), which can be used for sequent fluoride removal.

2. Batch Filtration for F Removal

Batch filtration tests were conducted by traditional bottle-point methods. The detailed experimental methods were described as follows and the results are shown in FIG. 2-5.

Herein, 5 mL of fluoride contaminated solution (F=10 ppm) was vacuum-filtered by the hybrid membrane (surface areas:0.0002 m2, diameter: 1.6 cm and thickness: 2 mm) rapidly, and various solution pH's (2.0-13.0) were adjusted using 1% NaOH and 1% HNO3; the effluents were collected for determining the fluoride concentrations and the corresponding Zr releases were also investigated using ICP-Ms. The results were shown in FIG. 2, The fluoride removal is also a representative pH-dependent process with the optimal pH ranging from 2.0 to 9.5. The results exhibited a stably removal efficiencies of ~above 92.3%, comparatively, the commercial zirconium oxide particles (1-2 μm) are inferior in fluoride uptake environment of pH>3.0, In addition, the dramatically sorption decreases at pH>10, Appealingly, the negligible Zr release in effluents also proves the excellent stability and safety for water purification.

The co-existed ion influences were also carried out using ubiquitous $SO_4^{2-}/Cl^-/NO_3^-$-ions at different concentrations and a commercial ion exchanged resin IRA-900 was also involved for comparison with the results of FIG. 3.

Observably, the CAF-Zr membrane displays effective fluoride scavenger with removal efficiency of >~92% (FIG. 3a-c). The slightly adsorption influence at high ionic backgrounds suggests the powerful selectivity; by contrast, the fluoride removal onto IRA-900 is dramatically declined at identical conditions, particularly, the sorption efficiency drops to almost nil at above 400 mg/L ions additions. the CAF-Zr membrane also revealed a superior Kd value of approximately 7000 ml/g (FIG. 3d), which is '~180 times greater than commercial ion exchange resin, verifying the exceptional selectivity for fluoride removal.

In addition, the real tap water and synthetic acidic wastewater were also selected as feedings to evaluate the application capability. The commercial carbon, activated aluminum oxide (AA) and ion exchange resin were recognized as model adsorbents for comparison (FIG. 4). The tap-water is taken from Switzerland with solution pH=7.2-7.6 and acidic wastewater component: $HCO_3^-$=50 mg/L, $Cl^-$=250 mg/L, $SO_4^{2-}$=150 mg/L, $NO_3^-$=120 mg/L, $Ca^{2+}$=55 mg/L, $Na^+$=280 mg/L, pH=2.5-2.8.

The hybrid CAF-Zr membrane showed remarkable performances for fluoride clearance, the removal efficiencies approach to ~95%, even 99.5% with trace level effluents (0.05-0.3 ppm) for various water sources (the feeding concentrations of tap water in Figure a-b are 4.2 mg/L and 10.8 mg/L respectively, while the feeding concentrations in acidic wastewater of Figure c-d are 22.6 mg/L and 202 mg/L respectively)

Afterward, the maximum sorption capacity was well examined by filtration with series feeding fluoride contents (F=10, 50, 100, 200, 300, 400, 500 ppm) at neutral and acidic conditions respectively.

The maximum fluoride capacity in tap-water and acidic wastewater were ~21.8 mg/g and 28.9 mg/g by filtration respectively, in contrast to the carbon matrix (1.88 mg/g and 1.93 mg/g)

The real application capacity tests were also performed using the hybrid membrane (FIG. 5), the feeding source is taken from the tap water in the city of Roma with initial F=2.8 ppm, a continuous filtration was conducted to evaluated the application capacity. In addition, the used membranes were also regenerated using 1% NaOH+5% NaCl mixture.

The results revealed that the hybrid membrane displayed outstanding performances for fluoride application and an average treatment capacity is approximately 1750 litres water/m2 membrane, on the basis of the drinking water criterion of WHO. In addition, the sorption-regeneration tests also verify the possible repeated use with effective fluoride stripping of ~94.8%

The synthetic high (200 ppm) and low (5 ppm) concentration feedings were also performed to evaluate the real capability for F removal. The detailed results were listed below.

| Feeding F contents | Treatment capacity [litres water/m$^2$ membrane*] |
|---|---|
| ~5 mg/L | ~1250 |
| ~10 mg/L | ~750 |
| ~20 mg/L | ~750 |
| ~100 mg/L | ~500 |
| ~200 mg/L | ~500 |

Analysis and Characterization

The concentrations of the fluoride ions were determined by an ion-selective electrode meter (EXTECH, FL700), the morphologies of the amyloid fibrils confined nano-ZrO2 and hybrid membrane were well investigated by high-resolution transmission electron microscopy (HR-TEM) (JEOL JEM-2100, Japan), with an accelerating voltage of 200 kV. The TEM samples were prepared by dropping it on a lacey carbon coated 200 mesh Cu grids. AFM was carried out on a MultiMode VIII Scanning Force Microscope (Bruker) in tapping mode under ambient conditions using the AFM cantilevers (Bruker) with a vibrating frequency of 150 kHz.

The microscope was covered with an acoustic hood to minimize vibrational noise. The droplets of 20 µL were deposited onto freshly cleaved mica, incubated for 2 min, rinsed with 1 mL of Milli-Q water and dried by pressured air. Images were simply flattened using the NanoScope Analysis 1.5 software, and no further image processing was carried out. The height profiles were obtained using NanoScope Analysis 1.5 software This corresponds to a reduction of 99.65% and shows the extremely high absorption rate of the inventive composite material.

The invention claimed is:

1. A water filter comprising:
a filter membrane comprising
a support membrane having a surface; and
a hybrid material on the surface of the support membrane, wherein the hybrid material comprises amyloid fibrils and nanoparticulate $ZrO_2$, wherein the amyloid fibrils and the nanoparticulate $ZrO_2$ are in intimate contact, remain separate and distinct and are thoroughly and randomly mixed; and wherein the nanoparticulate $ZrO_2$ is below 50 nm size.

2. The water filter of claim 1, wherein the nanoparticulate $ZrO_2$ is below 10 nm size.

3. The water filter of claim 2, wherein the ratio of amyloid fibrils to nanoparticulate $ZrO_2$ is in the range of from 1/0.1 to 1/300 (w/w).

4. The water filter of claim 3, wherein the amyloid fibrils are selected from fibrils being ≤10 nm in radius and ≥0.5 µm in length; the amyloid fibrils show electrophoretic mobilities of the order 2 µm·cm/V·s at pH 4 as determined according to zeta-potential measurement; and the nanoparticulate $ZrO_2$ has a particle size below 10 nm and wherein the ratio of amyloid fibrils to nanoparticulate $ZrO_2$ is in the range of from 1/1 to 1/100 (w/w).

5. The water filter of claim 1, wherein the support membrane is a support material that is a porous material.

6. The water filter of claim 5, wherein the porous material consists of activated carbon.

7. A water filter comprising;
a filter membrane comprising a material comprising amyloid fibrils and nanoparticulate $ZrO_2$; wherein the amyloid fibrils and the nanoparticulate $ZrO_2$ remain separate and distinct and are randomly mixed with one another; the nanoparticulate $ZrO_2$ is 10 nm in size or less; wherein the ratio of amyloid fibrils to nanoparticulate $ZrO_2$ is in the range of from 1/1 to 1/100 (w/w); and
a support material.

8. The water filter of claim 7, wherein the amyloid fibrils are selected from fibrils being ≤10 nm in radius and ≥0.5 µm in length; the amyloid fibrils show electrophoretic mobilities of the order 2 µm·cm/V·s at pH 4 as determined according to zeta-potential measurement.

9. The water filter for filtering fluoride of claim 7 wherein the nanoparticulate $ZrO_2$ and the amyloid fibrils form a hybrid material, and the hybrid material is located on a surface of the support material.

10. The water filter for filtering fluoride of claim 9, wherein the material is either the hybrid material disposed on the support material as a layer, or the hybrid material is disposed on the support material in a particulate form.

11. The water filter for filtering fluoride of claim 10, wherein the support material is porous and is made up of activated carbon.

12. A water filter for filtering fluoride comprising amyloid fibrils, nanoparticulate $ZrO_2$ confined to the amyloid fibrils, and a support material; wherein the amyloid fibrils and the nanoparticulate $ZrO_2$ remain separate and distinct and are randomly mixed with one another; the nanoparticulate $ZrO_2$ is below 50 nm size; wherein the ratio of amyloid fibrils to nanoparticulate $ZrO_2$ is in the range of from 1/1 to 1/100 (w/w).

13. The water filter for filtering fluoride of claim 12, wherein the amyloid fibrils are selected from fibrils being ≤10 nm in radius and ≥0.5 µm in length; the amyloid fibrils show electrophoretic mobilities of the order 2 µm·cm/V·s at pH 4 as determined according to zeta-potential measurement; and the nanoparticulate $ZrO_2$ has a particle size below 10 nm.

14. The water filter for filtering fluoride of claim 12, wherein the nanoparticulate $ZrO_2$ and the amyloid fibrils form a hybrid material, and the hybrid material is located on a surface of the support material.

15. The water filter for filtering fluoride of claim 14, wherein the support material is a porous material.

16. The water filter for filtering fluoride of claim 15, wherein the porous material is activated carbon.

17. The water filter for filtering fluoride of claim 14, wherein the nanoparticulate $ZrO_2$ is obtained in situ.

18. The water filter for filtering fluoride of claim 14, wherein the hybrid material is disposed on the support material as a layer, or the hybrid material is disposed on the support material in a particulate form.

19. The water filter for filtering fluoride of claim 13 further comprising a binder material chosen from the group consisting of cellulose pulp and a polymer material, and the binder material engages the support material to the nanoparticulate $ZrO_2$ and the amyloid fibrils.

20. The water filter for filtering fluoride of claim 12, wherein the nanoparticulate $ZrO_2$ and the amyloid fibrils remove 99.2% or above of fluoride from both (a) contaminated waters with fluoride concentrations below 10 ppm and (b) contaminated waters with fluoride concentrations above 50 ppm.

* * * * *